US011748510B1

(12) United States Patent
Beveridge et al.

(10) Patent No.: US 11,748,510 B1
(45) Date of Patent: Sep. 5, 2023

(54) PROTECTION OF PERSONAL DATA STORED IN VEHICULAR COMPUTING SYSTEMS

(71) Applicant: UIPCO, LLC, San Antonio, TX (US)

(72) Inventors: Meredith Beveridge, Golden, CO (US); James Stephan Harrison, San Antonio, TX (US); Sumita T. Jonak, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 114 days.

(21) Appl. No.: 17/083,537

(22) Filed: Oct. 29, 2020

Related U.S. Application Data

(60) Provisional application No. 62/927,491, filed on Oct. 29, 2019.

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/604* (2013.01)

(58) Field of Classification Search
None
See application file for complete search history.

(56) References Cited

U.S. PATENT DOCUMENTS

| | | | | |
|---|---|---|---|---|
| 9,171,268 | B1* | 10/2015 | Penilla | G06Q 30/0645 |
| 2006/0290470 | A1* | 12/2006 | Massoll | B60R 25/241 |
| | | | | 340/5.74 |
| 2012/0321078 | A1* | 12/2012 | Chambers | H04L 9/0891 |
| | | | | 380/44 |
| 2015/0052619 | A1* | 2/2015 | Kwak | G06F 21/6245 |
| | | | | 726/28 |
| 2015/0148989 | A1* | 5/2015 | Cooper | E05F 15/77 |
| | | | | 701/2 |
| 2015/0263860 | A1* | 9/2015 | Leboeuf | H04L 9/3226 |
| | | | | 713/171 |
| 2016/0189440 | A1* | 6/2016 | Cattone | G07C 5/008 |
| | | | | 701/31.5 |
| 2016/0253348 | A1* | 9/2016 | Mauti, Jr. | G06F 16/17 |
| | | | | 707/692 |
| 2017/0132157 | A1* | 5/2017 | Makke | G06F 12/1408 |
| 2018/0260567 | A1* | 9/2018 | Ullom | G06F 21/35 |
| 2020/0384953 | A1* | 12/2020 | Ohashi | B60R 25/25 |
| 2020/0402150 | A1* | 12/2020 | Gardner | G06Q 50/30 |

* cited by examiner

*Primary Examiner* — Alexander Lagor
*Assistant Examiner* — Felicia Farrow
(74) *Attorney, Agent, or Firm* — Plumsea Law Group, LLC

(57) ABSTRACT

A method and system protect personally identifiable information stored in an onboard computing system of a vehicle to improve data security of drivers. The method and system are each configured to automatically trigger a deletion or encryption of personal data stored in the motor vehicle in response to an event or other information indicating that the vehicle is outside of the custody of the owner or some other loss of control event.

20 Claims, 10 Drawing Sheets

PROTECTION OF PERSONAL DATA STORED IN VEHICULAR COMPUTING SYSTEMS

CROSS-REFERENCE TO RELATED APPLICATION

This application claims the benefit of U.S. Provisional Patent Application Ser. No. 62/927,491 filed on Oct. 29, 2019 and titled "Protection of Personal Data Stored in Vehicular Computing Systems", the disclosure of which is incorporated by reference in its entirety.

TECHNICAL FIELD

The present disclosure generally relates to the protection and security of personal data, and specifically to a method and system for deleting or otherwise safeguarding personally identifiable information stored in vehicles.

BACKGROUND

Identity theft is one of the fastest growing crimes in the world, and continues to become increasingly sophisticated and difficult to prevent. Personal information such as Social Security numbers, bank or other account numbers, telephone numbers, and addresses can become currency for identity thieves. For those victims whose information has been stolen, it can take months, and sometimes years, and thousands of dollars to correct the damage. Until the problem is resolved, victims of identity theft may face a precarious financial outcome or find that data that was confidential has now become highly vulnerable.

Theft of personally identifiable information (PII) from computers and online environments is particularly problematic and widespread. Public concern regarding the rapidly growing threat of personal identity theft has led to numerous companies offering insurance against such theft and/or monitoring of a consumer's credit and other accounts to detect unauthorized access, aimed at preventing or reducing risk of theft or misuse of personal and financial information. However, users tend to be more relaxed with respect to storing information on their personal devices and systems. For example, a mobile phone—and devices that are configured to communicate with the mobile phone—receive and store large amounts of PII. Furthermore, users frequently connect their mobile devices with databases and interfaces that are being used and accessed regularly by them, such as those provided by onboard computing systems of modern vehicles, but which do not offer the safeguards they associate with their other personal devices.

Vehicles can be configured to connect to a device via Bluetooth® to facilitate safe driving by allowing for in-car phone calls, alerts and navigation, internet access, and music streaming. Providing these services to a driver through vehicle-based computing systems and displays can significantly reduce the likelihood of accidents and damage to persons and property. However, conventional vehicle infotainment systems fail to offer drivers protection of the personal data that is being shared with the vehicle.

There is a need in the art for a system and method that addresses the shortcomings discussed above.

SUMMARY

In one aspect, a method of protecting information stored by an onboard computing system of a vehicle is disclosed. The method includes detecting a connection between a first user device and the vehicle computing system, and then receiving, at the onboard computing system and from the first user device, a first set of data. The method also includes storing the first set of data in a memory of the onboard computing system, and then determining a triggering event has occurred after storing the first set of data. Furthermore, the method includes executing, at the onboard computing system and in response to determining that a triggering event has occurred, a protective response directed to the stored first set of data, and discontinuing access of the onboard computing system to the first set of data.

In another aspect, a system for protecting data stored in an onboard computing system of a vehicle alerting a driver of a vehicle includes a processor and machine-readable media including instructions which, when executed by the processor, cause the processor to detect a connection between a first user device and the vehicle computing system and receive, at the onboard computing system and from the first user device, a first set of data. The instructions further cause the processor to store the first set of data in a memory of the onboard computing system and then to determine a triggering event has occurred after storing the first set of data. Furthermore, the instructions cause the processor to execute, at the onboard computing system and in response to determining that a triggering event has occurred, a protective response directed to the stored first set of data, and discontinue access of the onboard computing system to the first set of data.

In another aspect, a system for protecting data stored on an onboard computing system of a vehicle includes means for detecting a connection between a first user device and the vehicle computing system as well as means for receiving, at the onboard computing system and from the first user device, a first set of data. The system further includes means for storing the first set of data in a memory of the onboard computing system, and means for determining a triggering event has occurred after storing the first set of data. In addition, the system includes means for executing, at the onboard computing system and in response to determining that a triggering event has occurred, a protective response directed to the stored first set of data, and means for discontinuing access of the onboard computing system to the first set of data.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
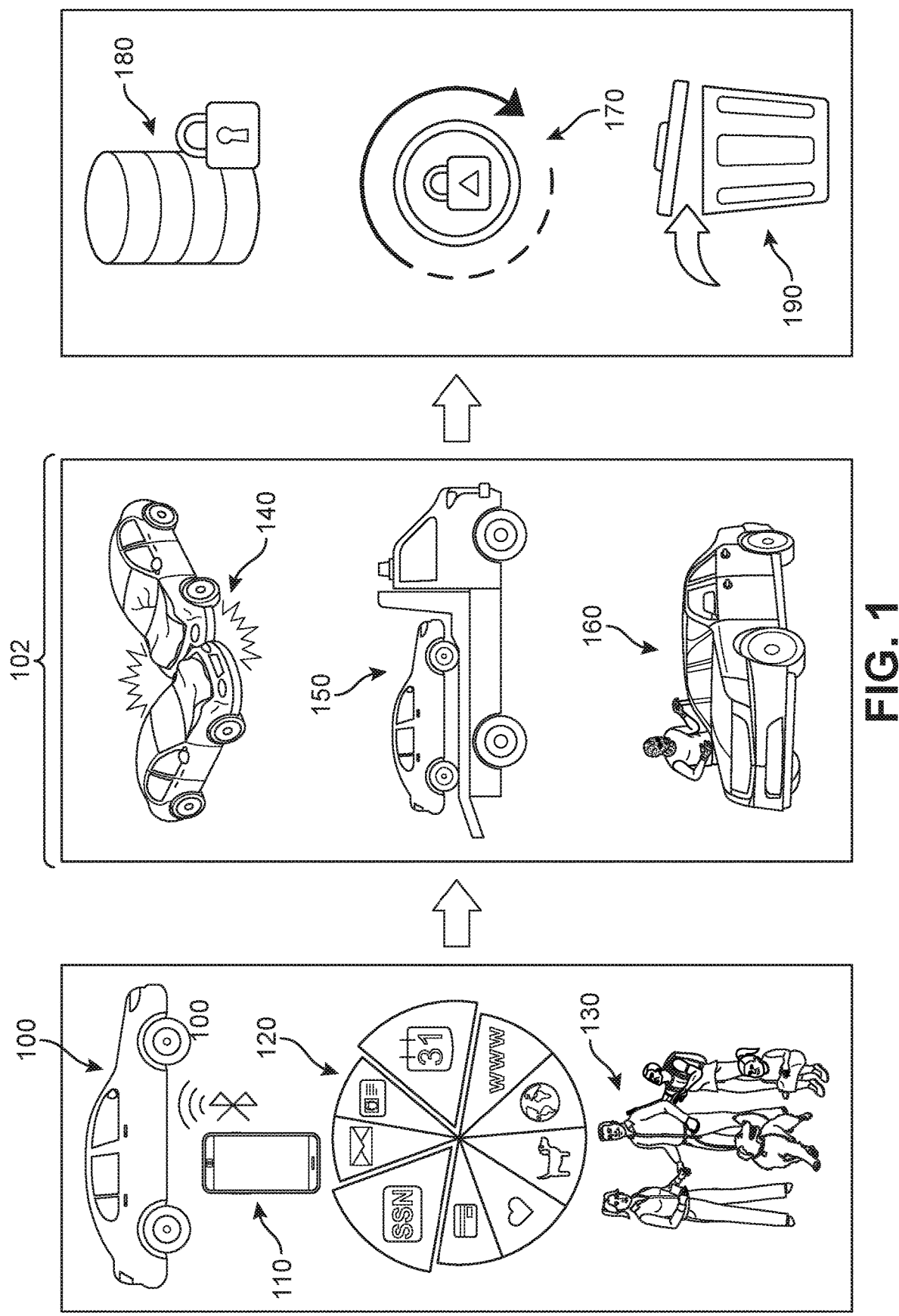
FIG. 1 is an overview of a scenario in which a vehicle may collect personal data from a user and automatically delete such data upon detection of a triggering event, according to an embodiment.

The embodiments provide a method and system to improve the security of personally identifiable information (PII). Specifically, the method and system enable the deletion of PII of a driver (or other occupant) of a motor vehicle in response to the detection of a triggering event and/or a remote command provided by the driver. For example, connecting a phone via Bluetooth® to a car when driving or renting a vehicle is often both highly convenient and attractive for purposes of navigation, playback of podcasts through the car speakers, as well as hands-free calling and messaging. However, such drivers often intentionally or unwittingly share a broad range of PII with the vehicle's computing system during these occasions. The proposed system would provide an option whereby the vehicle is capable of deleting or otherwise implementing a protective response mechanism (also referred to herein as a "protective response" or a "protective mechanism") for any PII after a car is sold, a rental car is returned, or following other events that are associated with a loss of custody of the vehicle and a corresponding increase in vulnerability of user data stored in the vehicle. Without such a system, PII can remain in a vehicle's infotainment system indefinitely and potentially be accessed by 'bad actors' or other unauthorized user to discover the previous owner's identity, address, personal contacts, garage door codes and other personal or sensitive information.

As will be discussed in greater detail below, the proposed systems and methods allow the vehicle's onboard computing system (OCS) to receive and establish rules and/or conditional events for determining how a user's PII should be maintained and held secure. In some embodiments, a user is provided with an ability to identify a triggering event that results in the automatic deletion of his or her PII stored in the OCS in response to the event's occurrence. By providing options that enhance the security of individual PII, drivers and passengers may more confidently make use of the OCS and its services, thereby promoting increased driving safety, and/or reducing stresses that can lead a driver to make rash or unsafe decisions. Furthermore, by protecting potentially sensitive data that is shared with the OCS, the likelihood of identity theft or other losses is reduced. The present system and methods may therefore be seen as protecting individuals from a wide range of harms.

For purposes of this application, personally identifiable information (PII) should be understood to include any personal information about an individual and/or persons connected to that individual. PII may also be referred to as sensitive data. PII can encompass data that either contains personally identifiable information, regulated data, financial information, classified data, or any data that would cause harm to an individual or an organization if it were to be compromised. Some examples of PII will be discussed with reference to FIG. 4 below.

In addition, a triggering event refers to an event or sequence of events that matches a pre-selected condition and will cause a security measure to be implemented, enabled, activated, implemented, and/or initiated. Some non-limiting examples of security measures include deletion of some or all of the individual's data stored in the OCS, as well as management of encryption policies for the data, and/or alerts or reminders that will be transmitted to the user.

For purposes of clarity, an overview of one embodiment of the proposed systems and methods is illustrated with reference to FIG. 1. In FIG. 1, a first user family ("family") 130 is shown in association with a vehicle 100. The family 130 own vehicle 100, and are regular and frequent occupants of vehicle 100. One or more members of family 130, when occupying vehicle 100, are accompanied by a mobile device 110. During various trips in vehicle 100, an onboard computing system (OCS) of vehicle 100 may access, receive, and/or store personal data 120 related to family 130, such as e-mail addresses and e-mail content, social security numbers, credit card or other financial account numbers and information, family member names and characteristics or preferences, sensitive health information, internet searches, images or photos, geographic location and routes, and other such information.

It can be appreciated that family 130 would desire and expect that their personal data 120 stored by the OCS to be protected. In some cases, family 130 can assume that because they are the sole owners and users of vehicle 100, all data received by vehicle 100 will remain private and safe. However, vehicles do not always remain in the possession or custody of their owners, as depicted in this example by a set of separation events 102, including a collision 140, towaway 150, and theft 160. If any of the separation events 102 occur, the personal data 120 stored in vehicle 100 may be outside of the control of the family 130 and/or become accessible to individuals outside of family 130. In other words, personal data 120 is now highly vulnerable.

In some embodiments, the proposed system can include provisions for automatically implementing a protective mechanism 170 in response to a determination that one of the separation events 102 has occurred. In some cases, the vehicle's users can be provided with the ability to remove connections and purge shared data from the vehicle's onboard computing system. In another case, the user can enable an automatic disconnect feature that will engage when the user and the device leave the vehicle's Bluetooth® or WiFi range. For example, the system may respond by initiating a lockdown state 180 around the personal data 120, de-authorize an encryption key, or initiate a wipe 190 of the personal data 120 from the OCS. As presented herein, the data security of family 130 can then be managed and protected from access or hacking by unauthorized users.

Figure 2:
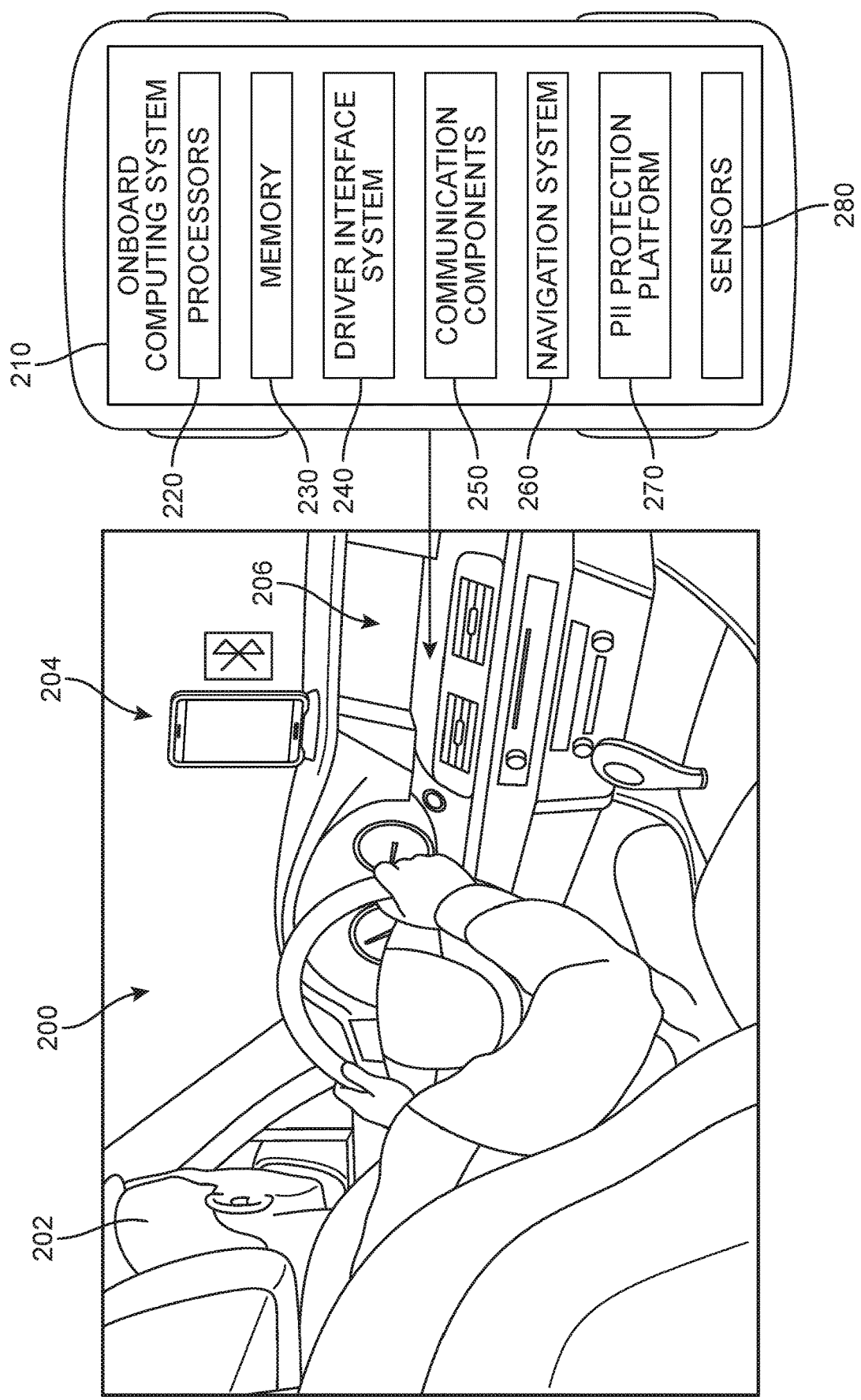
FIG. 2 is an example of an interior view of a motor vehicle alongside a schematic of a vehicle computing system, according to an embodiment.

Referring now to FIG. 2, a view of an interior of one embodiment of a motor vehicle ("vehicle") 200 is illustrated. For purposes of illustration, the interior of the vehicle 200 in FIG. 2 includes a driver 202 seated in the driver's seat and, in the driver's field of view, a mobile device 204 that connects to and communicates with components of vehicle 200. In other words, each time the mobile device 204 is brought into the vehicle, a connection event can occur during which the mobile device 204 is configured to share data with the vehicle 200. The vehicle 200 may include an onboard computing system 210. Onboard computing system 210 may comprise a single computing device, or a network of multiple computing devices. Onboard computing system 210 could be associated with one or more electronic control units (ECUs). As seen in FIG. 2, onboard computing system 210 includes one or more processors 220 and memory 230. Memory 230 may comprise a non-transitory computer readable medium. Instructions stored within memory 230 may be executed by the one or more processors 220.

For clarity, some of the vehicle systems of the embodiments are depicted as residing within a single onboard computing system 210. However, it may be appreciated that in some embodiments, one or more of these systems could be separate and may not comprise part of a single computing system. Instead, two or more systems could each comprise their own processors and/or memory, as well as components facilitating communication with other systems.

Vehicle 200 may also include one or more communication components 250. Communication components 250 may include cellular network components for communicating over cellular networks, Wi-Fi components for communicating over Wi-Fi networks, and other communication components.

Vehicle 200 may also include a navigation system 260. In some cases, navigation system 260 includes a GPS receiver that can receive GPS information. In other cases, navigation system 260 can include other receivers capable of receiving global or local positioning information. Additionally, navigation system 260 may comprise maps and/or information from other kinds of geographic information systems (GIS) that can be used to generate navigation routes for a driver.

Vehicle 200 may also include one or more vehicle sensors 280, including, but not limited to, internal cameras, external cameras, microphones, acceleration sensors (for example, an acceleration pedal sensor), theft detection sensors, wheel speed sensors, brake pedal sensors, impact, collision, and/or crash sensors, and steering angle sensors. Additionally, external road conditions (for example, adjacent vehicle proximity, dynamic objects) could be determined from a light detection and ranging system (LIDAR) and/or RADAR based sensors. Vehicle 200 may also include an onboard diagnostics (OBD) system, which is not shown for clarity. An OBD system may track and process various vehicle sensor information. In some cases, one or more systems of vehicle 200 could retrieve sensory data from the OBD system rather than directly from the sensors themselves.

In different embodiments, the onboard computing system 210 of vehicle 200 may be configured to communicate with one or more remote systems over a network (not shown in FIG. 2). The network could comprise any wide area network, local area network or other suitable network. In some cases, network may be the Internet. The onboard computing system 210 may communicate, for example, with one or more external database systems. An external database system can include a server (including processors and memory) and a database, and the external database system may store various kinds of information, including, but not limited to: navigation information, geospatial information, road conditions (for example, real-time traffic patterns), weather information (including, for example, rain, snow, ice and/or flooding forecasts), as well as other kinds of information. It may be appreciated that onboard computing system 210 may both send and receive information to and from these remote databases. Moreover, it may also be appreciated that in other embodiments, one or more of these databases (or parts of the databases) could be locally disposed within vehicle 200.

As seen in FIG. 2, the onboard computing system 210 can include or communicate with a PII protection platform 270, discussed in greater detail with reference to FIG. 3. The PII protection platform 270 may operate in conjunction with a driver interface system 240. Driver interface system 240 may be configured to receive and/or present various information to occupants (e.g., a driver and/or passengers) such as via a vehicle monitor or display 206.

Figure 3:
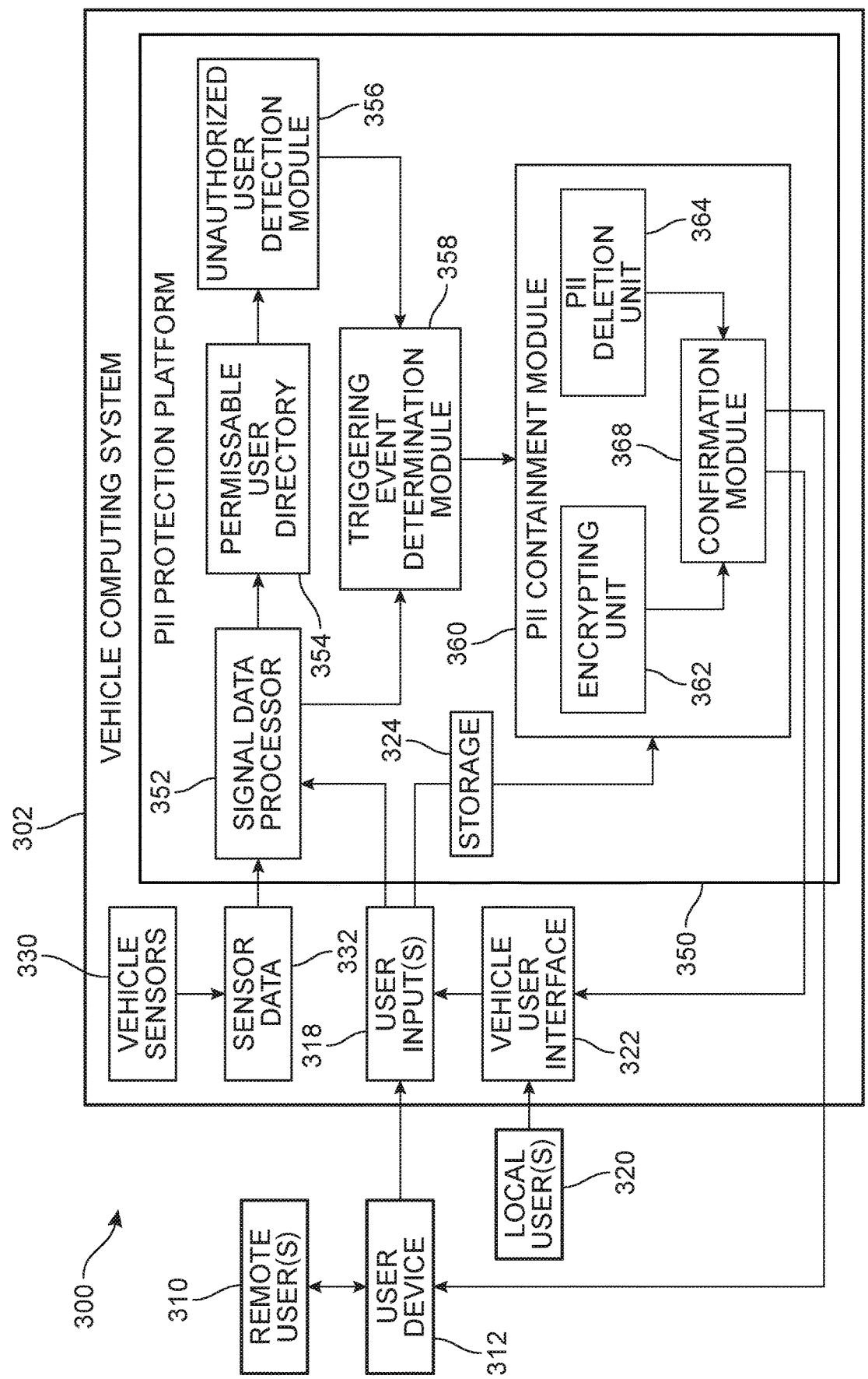
FIG. 3 is a schematic diagram of a personally identifiable information protection system, according to an embodiment.

Referring now to FIG. 3, a schematic diagram representing the architecture of one embodiment of a personally identifiable information (PII) protection system ("system") 300 is illustrated. In FIG. 3, the system 300 includes a vehicle onboard computing system (OCS) 302 that is in communication with external user devices such as user device 312, for example via a wired or wireless connection between the OCS 302 and a mobile device or laptop. End-users (e.g., drivers and other vehicle occupants) may access the OCS 302 as remote user(s) 310 through the user device 312, or directly as local user(s) 320 via a vehicle user interface 322 such as a touchscreen display, control panel, keypad, head-mounted display (HMD), and/or voice-activated controls provided by the vehicle. Local users 320 may also submit commands or share data via user device(s) 312 (e.g., while near or seated in the vehicle).

In different embodiments, users such as remote user(s) 310 and local user(s) 320 may engage with the various functionalities and services offered by OCS 302, for example, during vehicle use and travel. During these interactions, a vehicle occupant may authorize a connection event that enables the sharing of information between the user device 312 and the OCS 302. As another example, occupants may provide personal information associated with the occupants through inputs directly entered via the vehicle user interface 322. These will correspond to user data 318 in FIG. 3. The user data 318 can be utilized by OCS 302 in a variety of ways, such as navigation, web browsing, calls, messaging, providing recommendations, or other vehicle services. Furthermore, user data 318 may not be directly inputted by a user, but may include data generated as a result of user actions or requests. For example, passively generated information can also be recorded, such as the route a user drives and time of the trip, and can correspond to user data 318. The user data 318 may also include information such as music stations selected, phone numbers from which calls were received, or financial institutions and other sensitive locations that were visited. Thus, some or all of a wide range of user data 318 may be received by and maintained or managed in a vehicle data storage module 324.

In some embodiments, in order for a user to enroll and/or obtain access to the system 300, the user may submit one or more authorization tokens to the OCS 302. In other words, because it is understood that the OCS 302 may access sensitive and/or confidential information, the OCS 302 may require one or more authentication inputs such as passwords, facial recognition, and/or some other biometric security tokens to permit access. In some cases, login can occur following single-factor authentication (SFA), where the user only presents an identification badge or token such as a password in order to obtain access to the system. However, in many cases, additional steps or inputs may be required to better protect both the user's credentials and the resources the user can access. As one example, two-factor authentication (2FA), sometimes referred to as two-step verification or dual factor authentication, may be incorporated by the system to verify user identities. Two-factor authentication often provides a higher level of assurance than authentication methods that depend on SFA. For example, the system can include a 2FA process whereby users provide a first factor as well as a second factor. These factors can comprise possession factors or a security token (i.e., connected, disconnected, or contactless tokens), knowledge factors such as a password, and/or inherence or biometric factors such as an eye scan, fingerprint, or facial recognition scan. Two-factor authentication adds an additional layer of security to the authentication process, which can decrease the likelihood of unauthorized users gaining access to an organization's devices or user accounts, because in such cases possession of the security token alone is not enough to pass the authentication check. Thus, such authentication factors can also be stored as user data 318 that, if stolen, can be misused by bad actors.

Figure 4:
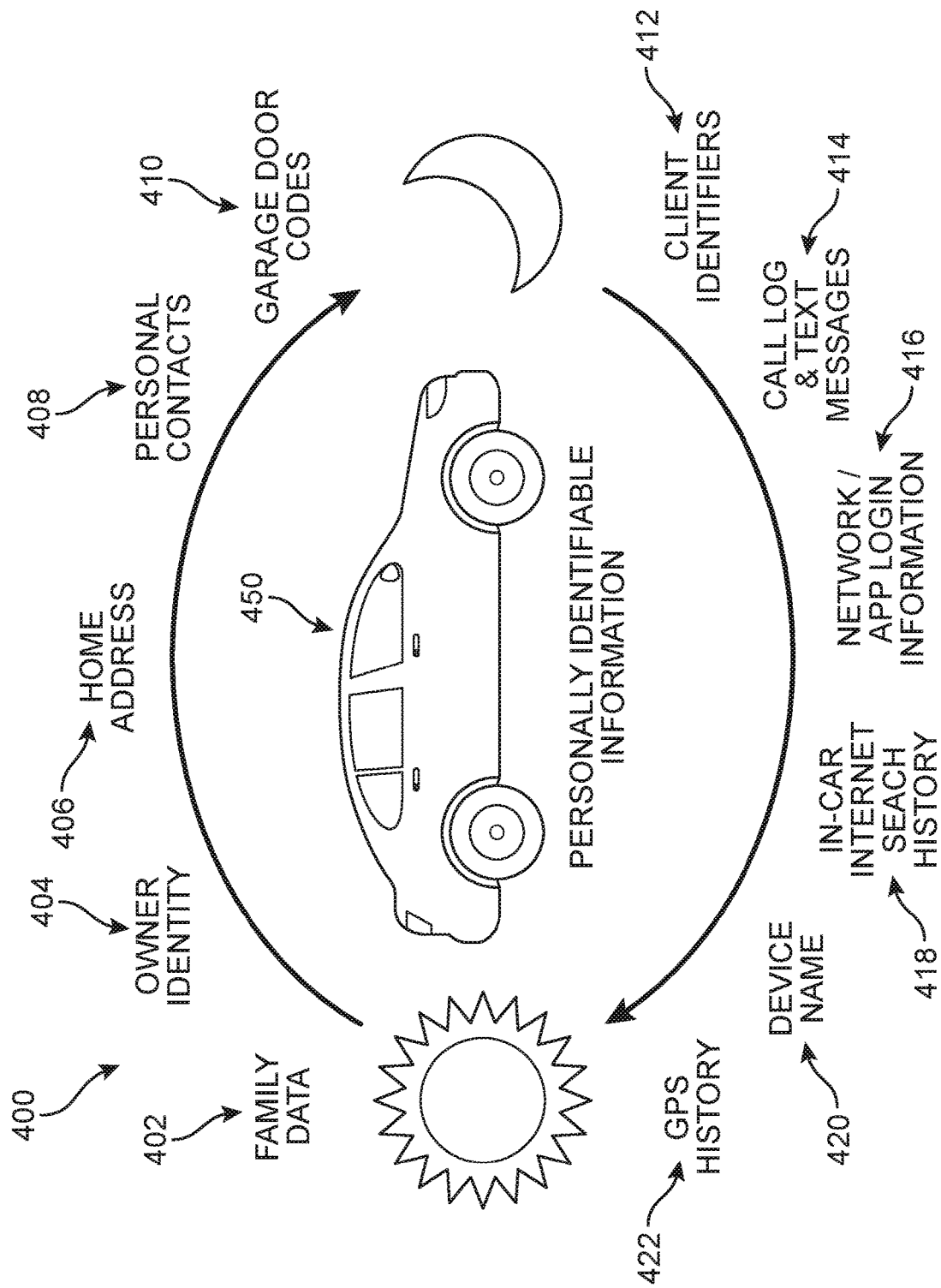
FIG. 4 is a schematic view of some examples of personally identifiable information that may be shared with a vehicle, according to an embodiment.

For purposes of clarity, FIG. 4 depicts a range of additional examples of PII 400 that may be collected or received by the OCS 302. For example, during the course of regular use of a vehicle 450, PII can include information directly identifying, related to, or connected to data about (a) an identity and personal preferences 404 of the vehicle owner (s) (or driver or other occupants) including but not limited to social security numbers, account numbers, habitual destinations and schedules, birthdate, musical selections, etc.; (b) a residential or home address 406 of occupants; (c) personal contacts 408; (d) garage door or gate codes or other vehicle entry security credentials 410; (e) client identifiers 412 for other individuals with whom the driver has contact or is conducting business for; (f) call log and text messages 414 (for example when the driver takes advantage of hands-free calling); (g) device, network, or application login information 416; (h) in-car internet search histories (418); (i) device name(s) 420; (j) GPS and navigation history 422; and (k) family and friends data 402, such as family or friend names, addresses, communications, email addresses, voice recognition, and media including images or information about minor children.

Returning now to FIG. 3, in many cases, these and other types of PII can be retained as user data 318 in data storage module 324 of OCS 302. As noted earlier, a vehicle may not always remain in the custody of the person(s) from whom such data has been collected, or the data stored in the vehicle may be otherwise identified as being vulnerable to unauthorized users or 'bad actors' (conditions referred to herein as triggering events). Such circumstances will be discussed in greater detail with respect to FIG. 5. In different embodiments, the system 300 can include provisions for containing, securely managing, and/or deleting the user data 318. In some embodiments, the OCS 302 can include or access a PII protection platform ("platform") 350 that can respond to the detection of various triggering events with one or more protective mechanisms. While the platform 350 is shown as being included in OCS 302, in other embodiments the platform 350 can be separate or remote from the OCS 302, and accessible over a network as a cloud-based service.

As shown in the embodiment of FIG. 3, in some embodiments, the OCS 302 may collect sensor data 332 from one or more vehicle sensors 330. The sensor data 332 can be received and processed by a signal data processor 352 of platform 350. Sensor data 332 can indicate changes in a condition of the vehicle or detection of a different vehicle status. For example, a vehicle may be associated with a default 'normal' state for most of its operational life, during which it is functioning within some pre-established range across one or more parameters. However, in some cases, the vehicle state may change in response to a change in conditions associated with the vehicle. As one example, if the vehicle is involved in a collision, the state can change to a 'crash' state. Thus, in different embodiments, the sensors and related components include provisions for identifying impacts with obstacles, detection of a towing event or break-in, or other conditions that may potentially affect the usability or custody of the vehicle. In some embodiments, this data can encompass information about the performance of the vehicle itself, referred to as vehicle feedback information. Examples of vehicle feedback information include, but are not limited to: vehicle lane position, vehicle maintenance and repair records and events, collision events, towing events, breakdown events, police possession, performance data, driver patterns, relative vehicle speed, adjacent vehicle proximity, and braking response. Various information can be received from one or more sensors described in FIG. 2.

In another example, the authorized user (driver) of a vehicle can identify and register one or more additional users of the vehicle, which will be received by signal data processor 352 and stored in a permissible user directory ("directory") 354 of platform 350. In the event that a person not identified in the directory 354 attempts to take control of the vehicle (for example, if a facial recognition scan does not match with any records in directory 354), an unauthorized user access detection module 356 can inform a triggering event determination module ("triggering module") 358. The triggering module 358 can also receive various data from the signal data processor 352 that allows the triggering module 358 to determine whether the vehicle is in a condition or scenario for which the user data 318 being held in storage 324 is vulnerable or otherwise corresponds to a state that has been previously identified (e.g., by the authorized user) as a state that should activate or 'trigger' activation of a PII secure containment module 360.

In other words, in response to the determination of the occurrence of a triggering event, either by information obtained by vehicle sensors 330 and/or user data 318 or other information transmitted to the vehicle by external applications, the PII secure containment module 360 can be configured to automatically implement a protective mechanism. Such a mechanism can include deletion of the user data via PII deletion unit 364. In another embodiment, the protective mechanism can instead involve encryption measures implemented via an encryption unit 362 that is configured to lock the user data 318, for example by de-authorizing an encryption key (also referred to herein as a cryptographic key) that permitted the exchange of data between the OCS 302 and user device 312. In some embodiments, this process can permanently or temporarily disable the PII data stored on the OCS by disassociation of a cryptographic key or keys encrypting the PII data from the encrypted PII data to make the PII data economically and/or computationally infeasible to recover. Some examples of disassociation may include encrypting, containing the information in a reserved directory of the OCS memory, establishing an expiration date, and/or other suitable methods of dissociation related to the cryptographic key or keys encrypting the PII data. In some embodiments, the user's device provides the encryption key at or around the same time as the connection event and data transfer occurs. In some examples, the encryption key is a cryptographic variable including a unique string of bits typically used by cryptographic algorithms, such as cryptographic algorithms executed by a cryptographic engine to transform source data to cipher data and back to source data. The cipher data contains all the information of the source data, but is in an encrypted format not readable by a human or computer without the proper mechanism to decrypt it. In some embodiments, the cryptographic algorithm used to encrypt or decrypt could be an RSA, Elliptic Curve Cryptographic (ECC), AES, 3DES, Blowfish, or other suitable cryptographic algorithm. In response to the determination that a triggering event has occurred, this key can be revoked or de-authorized.

In some optional embodiments, once the system verifies that the protective mechanism was successfully applied and the data has been safeguarded, a notification or other alert can be transmitted to the vehicle user interface 322 and/or user device 312 via a confirmation module 368 to inform the user that the data has been protected and provide the user with the reassurance that their information is no longer vulnerable. In some other embodiments, prior to implementation of a protective mechanism, the platform 350 can present a query to the user on the user device 312 and/or the vehicle user interface 322 that notifies the user of the determination of an occurrence of a triggering event, the type of triggering event detected, and provides an opportunity to belay or otherwise deactivate the operation of the PII secure containment module 360 in this instance.

Figure 5:
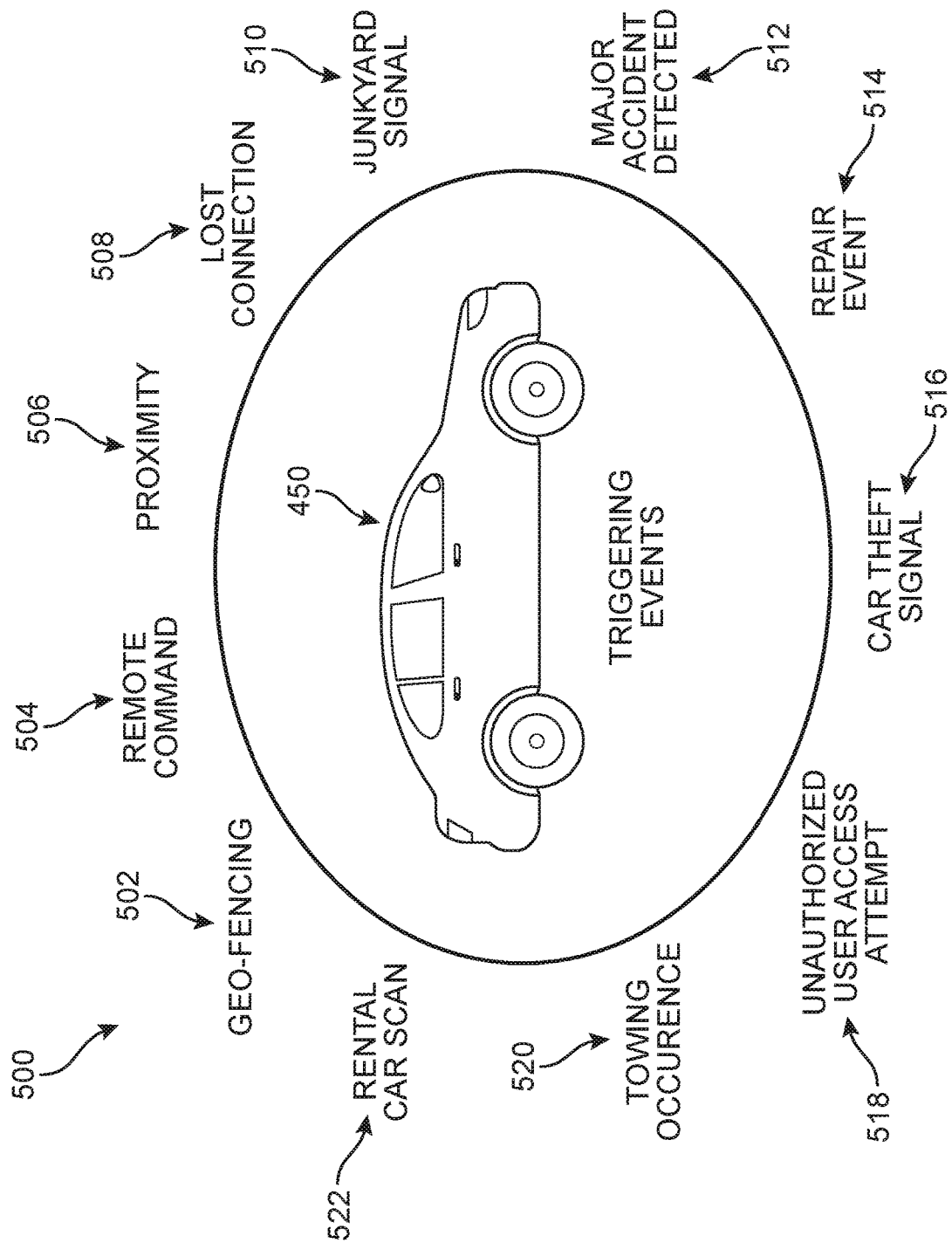
FIG. 5 is a schematic view of some examples of events that may trigger deletion of personal data stored in a vehicle, according to an embodiment.

Referring now to FIG. 5, some examples of triggering events ("events") 500 are illustrated. In some embodiments, the vehicle's onboard computing system may reach a determination that one of these events 500 has occurred based on information collected from several sources, such as vehicle sensors, user input, user device commands, and/or other instructions or information received via a network connection. A first example event ("geo-fencing") 502 occurs when the vehicle 450 moves outside of a pre-designated region or geographical area. This feature is referred to herein as geo-fencing, where global positioning (GPS) or radio frequency identification (RFID) is used to define a geographic boundary. This can be applied via a specific software module installed in the OCS. This geo-fencing feature can be configured as a default setting in the vehicle (for example, for rental car agencies that limit the use of their vehicles outside of a specific region or country) or added by the user based on their own personal preferences, residence, and driving range. Once the "virtual barrier" is established, the administrator can request that the PII secure containment module be activated when vehicle 450 exits the specified area or boundary.

Figure 9:
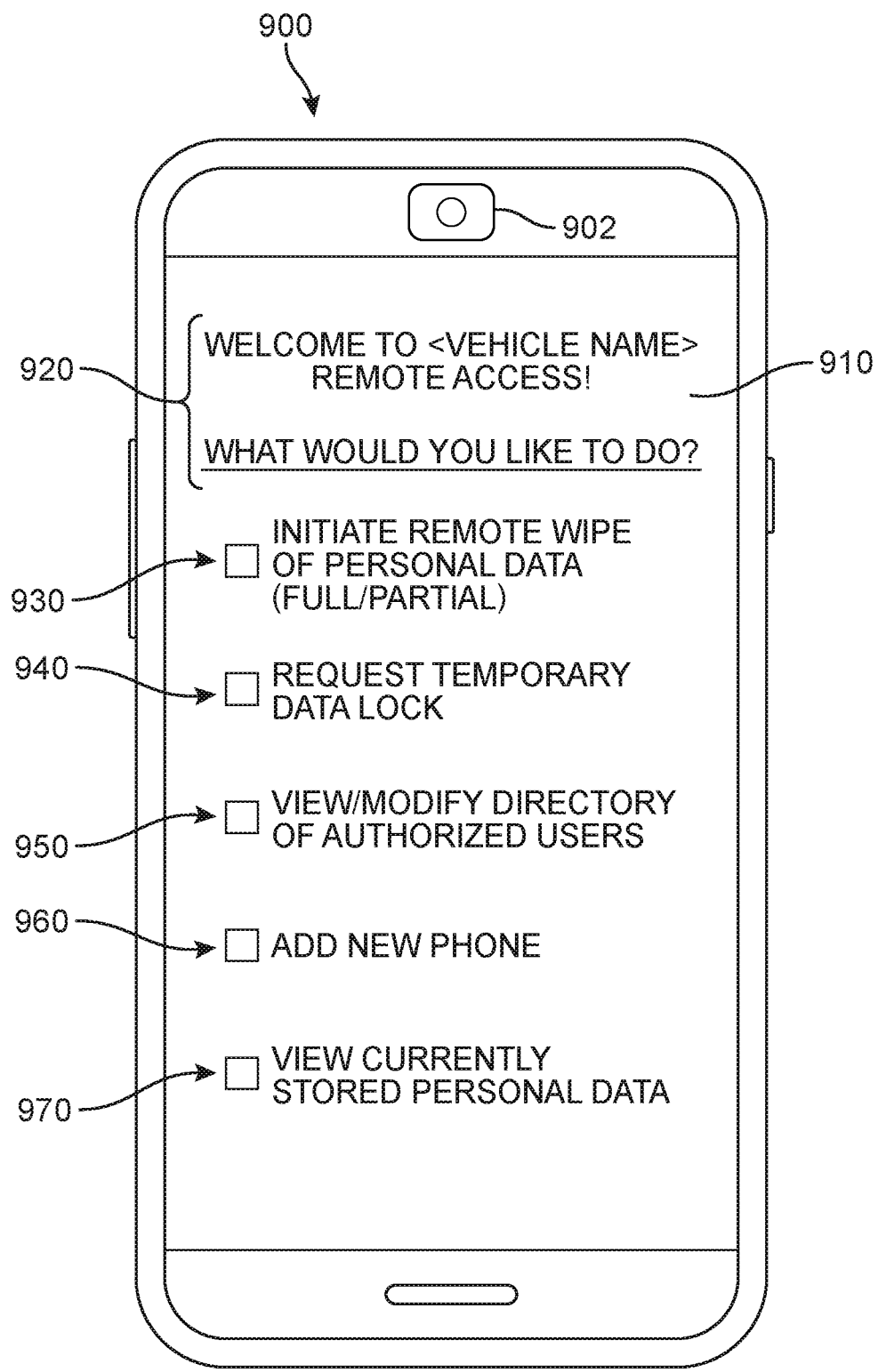
FIG. 9 is an example of a user interface for accessing and managing personal information stored in a vehicle, according to an embodiment, according to an embodiment.

A second example event ("remote command") 504 occurs when the authorized user submits a remote command via their mobile or other personal computing device to the OCS (e.g., see FIG. 9). In other words, the driver can remotely access some features of the OCS, including the functionality provided by the PII secure containment module, and instruct the OCS to perform a protective mechanism. In response to this request the OCS can proceed with a data deletion or lockdown. Thus, the user retains control of his or her own data regardless of the location or condition of the vehicle 450.

A third example event ("proximity") 506 occurs when the user's device is no longer in proximity with the vehicle 450. The proximity range can be selected by the authorized user, or can be based on a pre-designated (default) range associated with the system. In some embodiments, the user device can be configured or associated with a short-range radio transmitter, and must be within a certain range of the vehicle 450, usually between 1-20 meters, to share data and provide an encryption key to any previously stored data. For example, if the user device moves outside the proximity range, the OCS can automatically de-authorize an encryption key or proceed with a deletion of the data. Such a response may be particularly useful in cases where the user is a temporary user of the vehicle, such as borrowed vehicles or rental cars.

A fourth example event ("lost connection") 508 is a triggering event that occurs when the vehicle 450 loses its connection with the user device or the most recent data source. In some embodiments, this may be an extension of the proximity event, where the mobile device moves far enough from the vehicle that the signal from the mobile device is 'lost'. In another case, the lost connection can occur when the mobile device is turned off, when a remote user application installed on the mobile device that communicates with the vehicle OCS is disabled, when the mobile device is no longer able to transmit a signal (e.g., during an extended drive through a tunnel), etc.

A fifth example event ("junkyard signal") 510 refers to a situation in which the vehicle receives a signal from onboard sensors or other external inputs that the vehicle has traveled into the boundary of a junkyard or towing company. In other words, if a vehicle enters a junkyard, it is most likely no longer in the possession of the owner. A sixth example event ("major accident detected") 512 occurs when the vehicle 450 experiences a collision that appears to have caused a level of damage sufficient to necessitate removal of the vehicle from the custody of the owner (e.g., the vehicle has been 'totaled').

A seventh example event ("repair event") 514 occurs when the vehicle 450 enters a repair facility or specific portions of the vehicle engine are exposed or adjusted, which in most cases corresponds to a context in which a person who is not the owner of the vehicle having custody of the vehicle. An eighth example event ("car theft signal") 516 occurs when the vehicle receives a signal from onboard sensors or other external inputs that the vehicle is being broken into and/or receiving damage at entry points. Similarly, in some embodiments, the vehicle may be configured with an 'unauthorized access' detection alert or sensor when a person who is not a registered user of the vehicle attempts to access the OCS 302, as identified in the permissible user directory 354 (see FIG. 3). This is represented as a ninth example event ("unauthorized user access attempt") 518.

A tenth example event ("towing occurrence") 520 refers to a situation in which the vehicle receives a signal from onboard sensors or other external inputs that the vehicle is being towed. In other words, it can be assumed that if a vehicle is being towed that it is outside the agency of its owner. Furthermore, an eleventh example event ("rental car scan") 522 occurs when the vehicle 450 receives a signal that the vehicle has been returned to a rental car agency, such as in cases where the vehicle was being driven temporarily by a person. If the person shares data with the vehicle during the rental period, the designation of such a triggering event can help protect the renter from misuse of the data after the car is returned. In other implementations, a change in ownership of the vehicle can also correspond to a triggering event.

Figure 6:
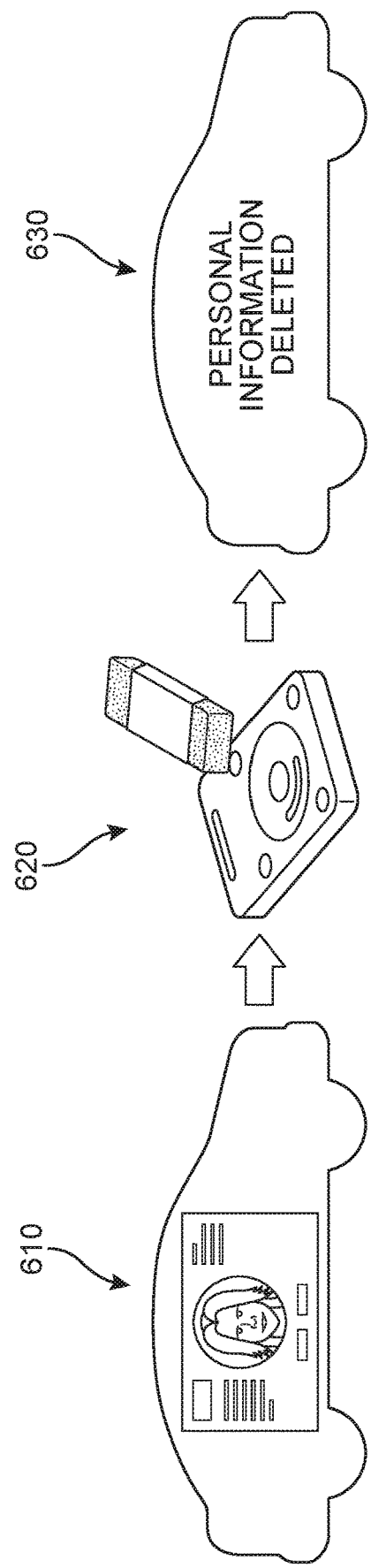
FIG. 6 is a schematic flow diagram of a data deletion event, according to an embodiment.

Thus, as described herein, the determination that a triggering event has occurred by the system can initiate a process by which otherwise vulnerable user data can be secured and/or deleted. In FIG. 6, a high-level flow diagram depicts the process that occurs in response to such a determination. In a first stage 610, PII is shown stored in a vehicle. Once the protective mechanism is activated, a second stage 620 ensues, whereby the storage module is wiped of the user's PII. Finally, in a third stage 630, the vehicle is shown as being free of or blocked from the user's data, thereby protecting the user from any subsequent attempts to access the data.

Figure 7:
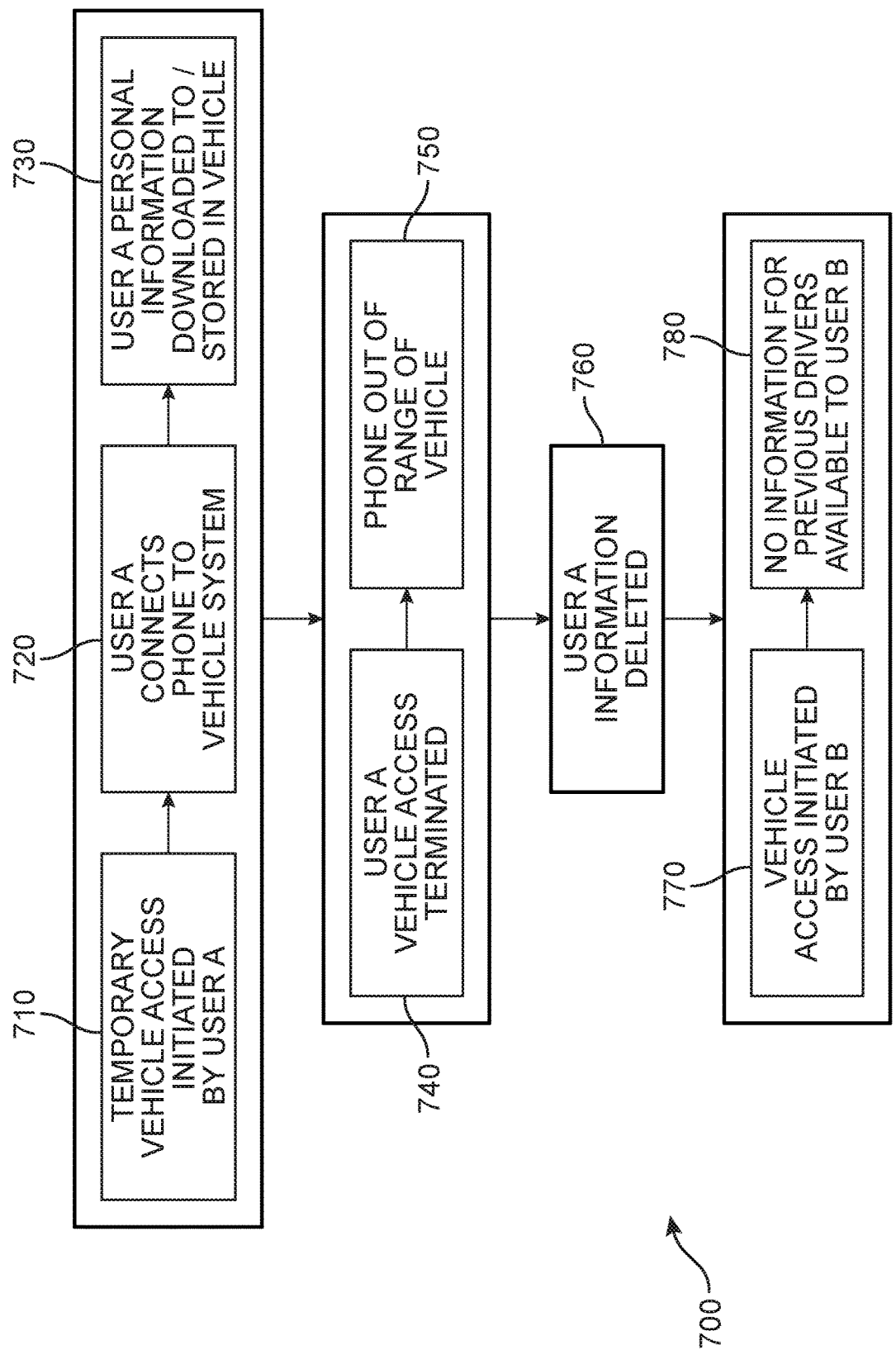
FIG. 7 is a flow diagram of a process of protecting personal data following temporary vehicle use, according to an embodiment.

Referring now to FIG. 7, a flow diagram 700 depicting an embodiment of a process of safeguarding user data following a temporary vehicle use session (such as, but not limited to, rental car, loaner car, or vehicle lease events) is shown. A first step 710 involves temporary vehicle access being initiated by a first user (User A), when User A obtains custody of the vehicle. In a second step 720 User A proceeds to connect his or her mobile device such as a cell phone to the vehicle's onboard computing system (OCS). In a third step 730, personal information may be shared between the user's phone and the vehicle and stored in the OCS.

In the next stage, User A terminates his or her access to the vehicle (e.g., by returning the car to its original or permanent owner or agency) in a fourth step 740, and the mobile device moves out of range or is otherwise disconnected from the vehicle in a fifth step 750. In some embodiments, upon detection of the vehicle access ending and/or disconnection of the mobile device, the system can determine a triggering event has occurred. In response to this determination, the system is configured to automatically initiate a deletion of the User A data from the memory of the OCS in a sixth step 760.

At a subsequent time, the same vehicle may be accessed by a second, different user (User B) in a seventh step 770. Because the data was automatically deleted previously, there is no information about any previous drivers available to User B (eighth step 780). In another embodiment not shown here, the deletion step may occur in response to the determination that a user other than User A and/or User A's mobile device has accessed the vehicle. In other words, the vehicle may maintain the data for User A until it detects a different user is now using the vehicle, allowing for User A to enjoy continuity of services between each driving session until the car is returned.

Figure 8:
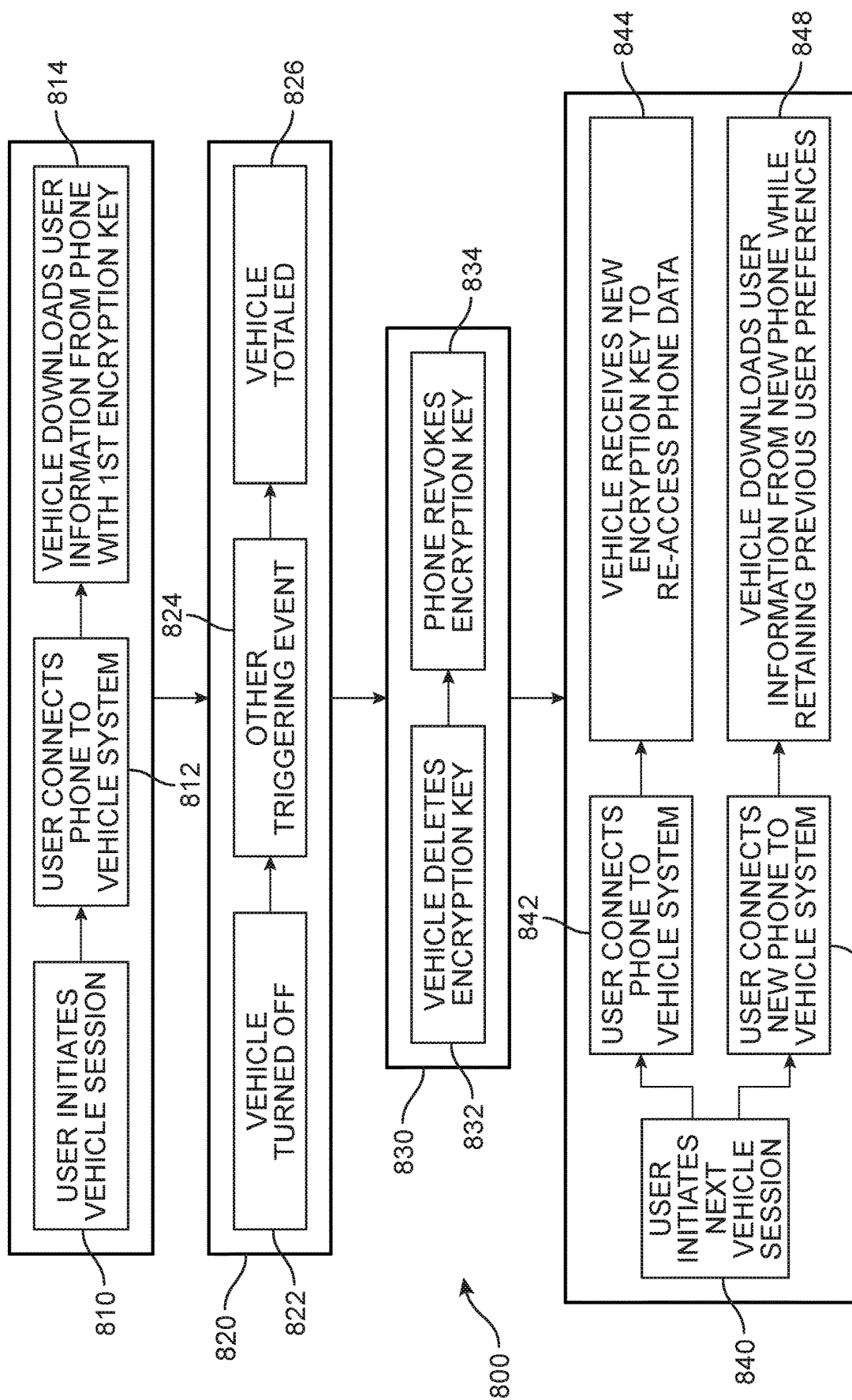
FIG. 8 is a flow diagram of a process of protecting personal data in a vehicle by application of a temporary encryption key, according to an embodiment.

Another example of a data protection process 800 is illustrated with reference to FIG. 8 in the context of data encryption (rather than data deletion). In a first step 810 a user initiates a vehicle usage session, followed by a second step of connecting the user's mobile device to the vehicle's OCS in a second step 812. In a third step 814 the vehicle receives an encryption key from the mobile device and proceeds to download user data from the mobile device. At a subsequent time, during a fourth step 820, a triggering event occurs in which, for example, the vehicle is turned off (first event 822), the vehicle is totaled (second event 826), or any other triggering event as discussed earlier with respect to FIG. 5 (events 824). In response to determining that one of the triggering events has occurred, in a fifth step 830, the OCS can delete the encryption key that had been previously granted by the mobile device (first protective mechanism 832) and/or the mobile device revokes the encryption key (second protective mechanism 834).

In this example, when the same or a different user initiates a subsequent vehicle access session (a sixth step 840), the user may be offered one or both of two paths for sharing data. In the case where the user connects the same mobile device (a seventh step 842) as occurred in second step 812, the vehicle can renew its connection lease or otherwise receive a new encryption key to re-access the data on the phone in an eighth step 844. However, as represented by a ninth step 846, in cases where it is a different mobile (e.g., upgraded) or other computing device that is being connected to the vehicle by the same user, the vehicle can be configured to retain the previously established user preferences based on its relationship with the original mobile device and the user's requests in a tenth step 848. In other words, because the previous data was not entirely erased but instead encrypted, the system retains the information about the user's habits and/or preferences and apply such 'non-sensitive' data to the next vehicle access session with the same user.

As noted earlier, in some embodiments, a vehicle end-user can interact with and adjust settings associated with the proposed systems remotely. FIG. 9 presents an example of a representative vehicle data management interface ("interface") for implementing a vehicle data protection system. In some embodiments, an application may be available that connects directly to the vehicle OCS (for example, via a WiFi or Bluetooth® connection), while in other embodiments, the application may be configured to communicate with an online service provider to change the settings in the cloud, and automatically update the corresponding vehicle settings the next time that the vehicle is connected to the cloud service (e.g., when the car ignition is turned on). The application can be accessed via any user computing device configured for connection to a network.

In FIG. 9, an example of a 'main menu' application interface 910 is presented on a touchscreen display of a mobile device 900 offering content via native controls included in the interface 900. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation The interface 910 can include a welcome header message 920, as shown in FIG. 9 ("Welcome to <Vehicle Name> Remote Access! What would you like to do?"). In addition, a plurality of options can also be presented. Some non-limiting examples of such options are shown in FIG. 9, including a first option 930 ("Initiate remote wipe of personal data (Full/Partial)") for submitting a command to the designated vehicle to delete the PII stored on the vehicle. A second option 940 ("Request temporary data lock"), if selected, can trigger a lockdown of the PII, whereby the PII is blocked and cannot be accessed by anyone until the lock has been disabled. Such an option gives users the ability to protect data in situations where there is an expectation that they will regain possession of the vehicle (e.g., where the vehicle has been towed, or they will be going on vacation and leaving the vehicle unattended for several weeks, or even during a brief grocery store stop). In other embodiments, the interface 910 can include further options or a secondary menu by which a user can schedule such locks to occur at a point in the future, and/or to occur for blocks of time on a regular or repeating basis. For example, if the user knows the car will be out for repair for the next week, he or she can schedule a data lockdown in advance as a proactive security measure. The lockdown can be indefinite (i.e., remain in place until disabled) or be implemented for a specified period of time.

A third option 950 ("View/modify directory of authorized users") allows the end-user to access the permissible user directory (see FIG. 3) and make changes when desired. In some embodiments, the interface 910 can include further options or a secondary menu by which the user can update login information including biometric data. For example, a device camera 902 can be used to capture facial images and register one or more users with the system and maintain a database of authorized users. The vehicle OCS may include a facial recognition system that can match drivers with the images in the database before permitting access to personal data stored in the vehicle. A fourth option 960 ("Add new phone") can provide an opportunity for the end-user to register additional phones for sharing data with the vehicle and applying the same protections to that data. This can be useful for individuals who have multiple phones for personal and business use, or vehicles with families that use several phones. Finally, a fifth option 970 ("View currently stored personal data") can be offered that allows users to review the data that has been shared with the vehicle and is currently stored on the vehicle's OCS. In some embodiments, the user may be able to delete selected portions of the data stored on the OCS. In other embodiments (not illustrated in FIG. 9) the system can permit a user to specifically identify the types of triggering events and/or conditional deletion rules that will trigger an automatic deletion of data or files that may be stored in the OCS. In another example, the user may be able to select one or more rules that inform the system how and/or when the data should be deleted. For example, a user may request that PII stored longer than two weeks be deleted, or PII content that exceeds a pre-set amount, such as 2 GB, be deleted, or PII that includes images be automatically wiped after the current trip. In some other embodiments, the system may be configured to alert the user when it appears that the vehicle and/or PII is approaching a state in which a deletion will be initiated, and allow the user to delay or disable the upcoming deletion. In some embodiments, the event types can be selectable from drop-down menus.

It should be understood that the text and specific wording shown in the figures are for purposes of illustration only and in no way limit the manner by which the application may communicate or receive information. In addition, while the options are shown as a list in FIG. 9, it should be understood that in other embodiments one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Figure 10:
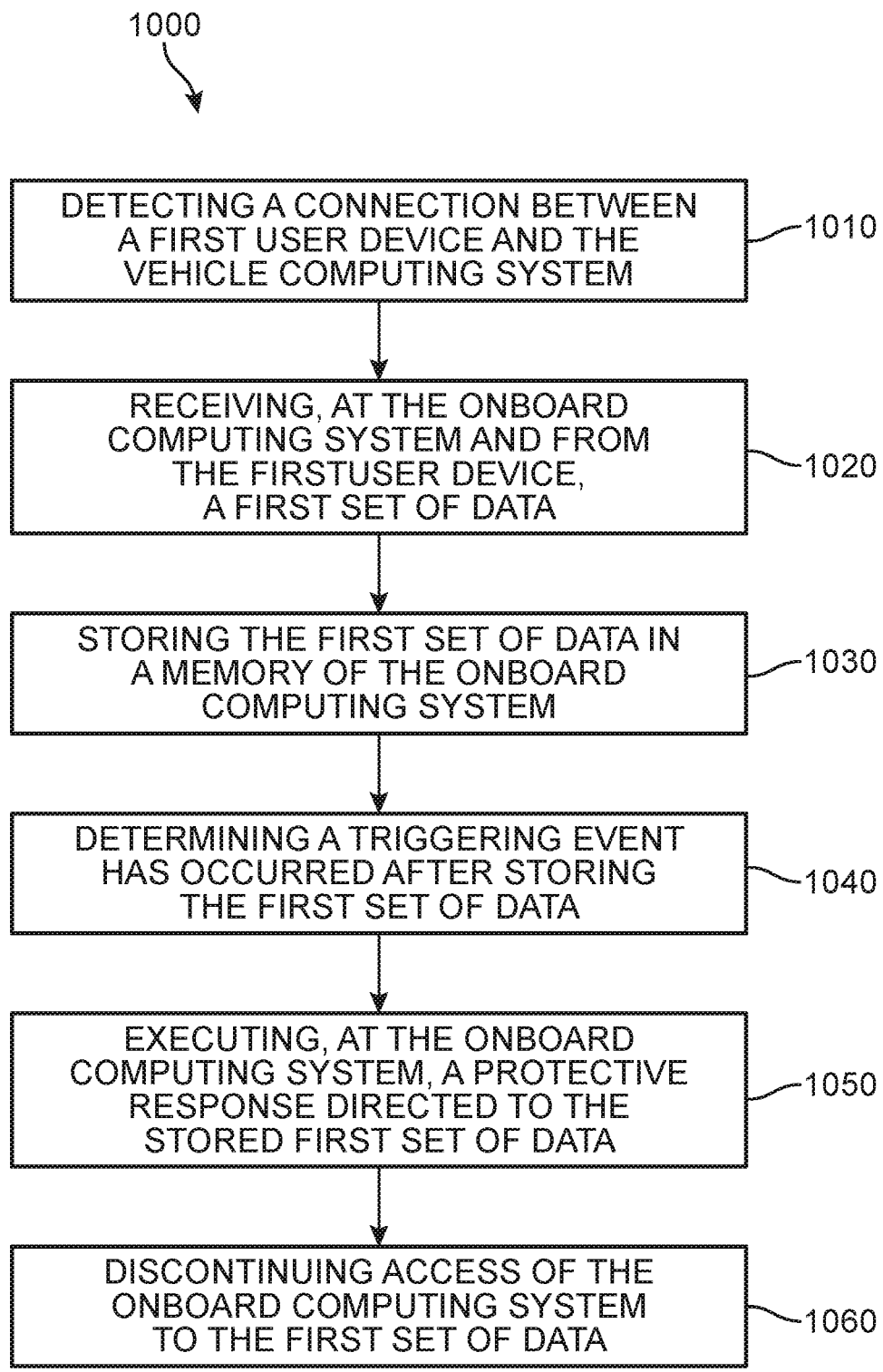
FIG. 10 is a flow chart depicting a process of protecting personal data of a driver or other user of a vehicle, according to an embodiment.

FIG. 10 is a flow chart illustrating an embodiment of a method 1000 of protecting personally identifiable information (PII) stored in an onboard computing system of a vehicle. In a first step 1010, the method 1000 includes detecting a connection between a first user device and the vehicle computing system. In a second step 1020 the method 1000 includes receiving, at the onboard computing system and from the first user device, a first set of data such as PII or other personal data. A third step 1030 includes storing the first set of data in a memory of the onboard computing system, and a fourth step 1040 includes determining a triggering event has occurred after storing the first set of data as discussed above. In a fifth step 1050 the method 1000 includes executing, at the onboard computing system and in response to determining that a triggering event has occurred, a protective response directed to the stored first set of data. Finally, a sixth step 1060 includes discontinuing access of the onboard computing system to the first set of data as a result of executing the protective response.

In other embodiments, the method may include additional steps or aspects. In one embodiment, determining a triggering event has occurred is based at least in part on the vehicle receiving a signal indicating the vehicle has been returned to a rental car agency. In another embodiment, determining a triggering event has occurred is based at least in part on the vehicle receiving a signal indicating the vehicle has entered a vehicle junkyard or repair shop. In some embodiments, determining a triggering event has occurred is based at least in part on the vehicle receiving a signal indicating the vehicle has been involved in a collision or is being towed. In some cases, determining a triggering event has occurred is based at least in part on the vehicle receiving a signal indicating the vehicle is outside a pre-designated geographical boundary, as established by the vehicle owner or another agency.

In another example, determining a triggering event has occurred is based at least in part on the vehicle receiving a remote command from the first user device. In such cases, the method may further include presenting an application interface to the first user on a display of the first user device. For example, the application interface can present a menu with a plurality of options for communicating with the onboard computing system. The first user device can be located outside of the vehicle, where the first user is remote relative to the vehicle's location. The method can also include receiving, via the application interface, a request to initiate the protective response, and generating and transmitting the remote command from the first user device to the onboard computing system.

In some embodiments, the method may further include the step of presenting a notification to the first user via the first user device confirming that the protective response has been successfully implemented. In another example, the protective response includes a full or partial deletion of the first set of data from the onboard computing system. In some other examples, the method includes receiving, at the onboard computing system and from the first user device, an encryption key for de-encrypting the first set of data, where the protective response includes deauthorizing the encryption key and thereby re-encrypting the first set of data. In one example, the first set of data can include one or more of an identity, address, call history, text message content, and garage entry codes. In another example, the method can also include presenting a warning notification to the first user (e.g., via the first user device) that the system has determined a triggering event has occurred and the first set of data is about to be deleted. As another example, the method can include receiving a list from the first user identifying the types of conditions and/or events that should qualify as triggering events. In some embodiments, the method can include a subsequent connection (second connection event) with a second user device in which a second set of data is shared with the onboard computing system, and the protective response also applies to the second set of data.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of protecting information stored by an onboard computing system of a vehicle, the method comprising:
    detecting a connection between a first user device of a first user and the onboard computing system;
    receiving, at the onboard computing system and from the first user device, a first set of data comprising personally identifiable information of the first user;
    storing the first set of data in a memory of the onboard computing system;
    receiving, by the onboard computing system, at least one configuration remote command from the first user device to remotely set at least one operational preference of the onboard computing system;
    wherein the onboard computing system manages the first set of data using the at least one operational preference;
    determining a triggering event has occurred after storing the first set of data
    by detecting a change in ownership of the vehicle and receipt of a locking remote command from the first user using the first user device, the locking remote command being a remote command to lock down access of the onboard computing system to the first set of data;
    executing, at the onboard computing system and in response to determining that the triggering event has occurred, a protective response directed to the first set of data;
    wherein the protective response comprises locking down access of the onboard computing system to the first set of data while maintaining the first set of data in a storage of the onboard computing system;
    receiving an unlocking remote command from the first user using the first user device, the unlocking remote command being a remote command to unlock access of the onboard computing system to the first set of data; and
    restoring access of the onboard computing system to the first set of data after receiving the unlocking remote command.

2. The method of claim 1, wherein determining the change in ownership has occurred is based at least in part on the vehicle receiving a signal indicating the vehicle has been stolen by detecting a signal from onboard sensors indicating at least one of that the vehicle is being broken into and damage at entry points of the vehicle.

3. The method of claim 1, wherein determining the change in ownership has occurred is based at least in part on the vehicle receiving a signal indicating the vehicle has entered a repair shop by detecting that portions of an engine of the vehicle are at least one of exposed and adjusted.

4. The method of claim 1, wherein determining the change in ownership has occurred is based at least in part on the vehicle receiving a signal indicating the vehicle has been returned to a rental car agency.

5. The method of claim 1, further comprising:
    presenting an application interface to the first user on a display of the first user device, the application interface including a plurality of options for communicating with the onboard computing system, the first user device being located outside of the vehicle;
    receiving, via the application interface, a request to initiate the protective response; and
    generating and transmitting the locking remote command from the first user device to the onboard computing system.

6. The method of claim 5, wherein determining the change in ownership has occurred is based at least in part on the vehicle detecting an unauthorized driver using facial recognition by comparing a photograph of a driver to stored photographs of authorized drivers, wherein at least one of the stored photographs of the authorized drivers is provided by the first user using the application interface.

7. The method of claim 5, wherein the application interface allows the first user to identify specific types of triggering events that will trigger the protective response.

8. The method of claim 1, further comprising presenting a notification to the first user via the first user device confirming that the protective response is about to occur and providing an opportunity to deactivate the protective response.

9. The method of claim 1, further comprising:
    receiving, at the onboard computing system and from the first user device, an encryption key for de-encrypting the first set of data; and
    wherein the protective response includes deauthorizing the encryption key and thereby re-encrypting the first set of data.

10. The method of claim 9, wherein the encryption key is a two-factor encryption key including at least one possession factor and at least one inherence factor.

11. A system for protecting data stored in an onboard computing system of a vehicle, the system comprising:
    a memory storing instructions;
    at least one processor coupled to said memory, configured to:
    detect a first connection between a first user device of a first user and the onboard computing system;
    receive, at the onboard computing system and from the first user device, a first set of data comprising personally identifiable information of the first user;
    store the first set of data in a memory of the onboard computing system;
    receive, at the onboard computing system and from the first user device, an encryption key for de-encrypting the first set of data;
    determine a triggering event has occurred after storing the first set of data by detecting a change in ownership of the vehicle;
    execute, at the onboard computing system and in response to determining that the triggering event has occurred, a protective response directed to the stored first set of data;
    wherein the protective response includes deauthorizing the encryption key and thereby re-encrypting the first set of data;
    discontinue access of the onboard computing system to the first set of data while maintaining the first set of data in a storage of the onboard computing system; and
    detect a second connection between a subsequent user device of the first user and the onboard computing system;
    wherein when the subsequent user device is a same device as the first user device, the onboard computing system restores access to the first set of data using a newly generated encryption key while maintaining user preferences of the first user;
    wherein when the subsequent user device is a different device from the first user device, the onboard computing system obtains a second set of data comprising personally identifiable information of the first user from the different device while maintaining the user preferences of the first user.

12. The system of claim 11, wherein the at least one processor is further configured to:
   receive, by the onboard computing system, at least one configuration remote command from the first user device to remotely set at least one operational preference of the onboard computing system;
   wherein the onboard computing system manages the first set of data using the at least one operational preference.

13. The system of claim 11, wherein determining the change in ownership has occurred is based at least in part on the vehicle receiving a signal indicating the vehicle has entered a repair shop by detecting that portions of an engine of the vehicle are at least one of exposed and adjusted.

14. The system of claim 11, wherein determining the change in ownership has occurred is based at least in part on the vehicle receiving a signal indicating the vehicle has experienced a major accident.

15. The system of claim 11, wherein the at least one processor is further configured to present a notification to the first user via the first user device confirming that the protective response is about to occur and provide an opportunity to delay the protective response.

16. The system of claim 11, wherein the at least one processor is further configured to:
   present an application interface to the first user on a display of the first user device, the application interface including a plurality of options for communicating with the onboard computing system, the first user device being located outside of the vehicle;
   receive, via the application interface, a request comprising a remote command from the first user device to initiate the protective response; and
   generate and transmit the remote command from the first user device to the onboard computing system.

17. The system of claim 16, wherein the application interface allows the first user to change the user preferences of the first user in a cloud network and the user preferences of the first user are updated at the vehicle when the vehicle is connected to the cloud network.

18. The system of claim 11, wherein the protective response includes a partial deletion of the first set of data from the onboard computing system.

19. The system of claim 11, wherein the determining a change in ownership has occurred is based at least in part on the vehicle receiving a signal indicating the vehicle has lost a connection with the first user device.

20. A method of protecting information stored by an onboard computing system of a vehicle, the method comprising:
   detecting a connection between a first user device of a first user and the onboard computing system;
   receiving, at the onboard computing system and from the first user device, a first set of data comprising personally identifiable information of the first user;
   storing the first set of data in a memory of the onboard computing system;
   receiving, by the onboard computing system, at least one configuration remote command from the first user device to remotely set at least one operational preference of the onboard computing system;
   wherein the onboard computing system manages the first set of data using the at least one operational preference;
   determining a triggering event has occurred after storing the first set of data
   by detecting a change in ownership of the vehicle and receipt of a locking remote command from the first user using the first user device, the locking remote command being a remote command to lock down access of the onboard computing system to the first set of data from a first scheduled time to a second scheduled time;
   executing, at the onboard computing system and in response to determining that a triggering event has occurred, a protective response directed to the first set of data;
   wherein the protective response comprises locking down access of the onboard computing system to the first set of data at the first scheduled time while maintaining the first set of data in a storage of the onboard computing system; and
   restoring access of the onboard computing system to the first set of data after the second scheduled time.

* * * * *